United States Patent
Fernando

(10) Patent No.: US 8,713,830 B2
(45) Date of Patent: May 6, 2014

(54) COVER MEMBER AND STICKER

(75) Inventor: Dilshan Fernando, Toyota (JP)

(73) Assignee: Toyota Jidosha Kabushiki Kaisha, Toyota-Shi (JP)

(*) Notice: Subject to any disclaimer, the term of this patent is extended or adjusted under 35 U.S.C. 154(b) by 117 days.

(21) Appl. No.: 13/421,667

(22) Filed: Mar. 15, 2012

(65) Prior Publication Data

US 2012/0234290 A1   Sep. 20, 2012

(30) Foreign Application Priority Data

Mar. 18, 2011  (JP) .................... 2011-061092

(51) Int. Cl.
   *G09F 7/00*   (2006.01)

(52) U.S. Cl.
   USPC .......................................... 40/638; 181/204

(58) Field of Classification Search
   USPC .............. 40/625, 630, 642.02, 643, 594, 760; 123/198 E
   See application file for complete search history.

(56) References Cited

U.S. PATENT DOCUMENTS

| | | | |
|---|---|---|---|
| 4,064,645 A * | 12/1977 | Wood | 40/768 |
| 4,584,232 A * | 4/1986 | Frank et al. | 442/30 |
| 5,421,939 A * | 6/1995 | Scher et al. | 156/235 |
| 5,464,681 A * | 11/1995 | Luce | 428/195.1 |
| 6,126,865 A * | 10/2000 | Haak et al. | 252/512 |
| 6,312,821 B1 * | 11/2001 | Takasaki et al. | 428/472.3 |
| 6,478,004 B1 * | 11/2002 | Deng et al. | 123/195 C |
| 6,682,679 B1 * | 1/2004 | Marentic et al. | 264/247 |
| 7,083,211 B1 * | 8/2006 | Bores | 296/1.08 |
| 7,954,596 B2 * | 6/2011 | Schulze et al. | 181/204 |
| 2003/0214082 A1 * | 11/2003 | Jones et al. | 264/523 |
| 2004/0231211 A1 * | 11/2004 | Johnson | 40/594 |
| 2005/0082875 A1 | 4/2005 | Ikeda et al. | |
| 2007/0287001 A1 * | 12/2007 | Carlson et al. | 428/304.4 |
| 2008/0178502 A1 * | 7/2008 | Stuchell | 40/200 |
| 2009/0000170 A1 * | 1/2009 | Capuzzi | 40/643 |
| 2010/0224438 A1 * | 9/2010 | Schulze et al. | 181/204 |
| 2012/0234290 A1 * | 9/2012 | Fernando | 123/198 E |

FOREIGN PATENT DOCUMENTS

| | | |
|---|---|---|
| CN | 1600622 A | 3/2005 |
| JP | 2001003763 A | 1/2001 |
| JP | 2002-129974 A | 5/2002 |
| JP | 2007-230312 A | 9/2007 |

\* cited by examiner

*Primary Examiner* — Shin Kim
(74) *Attorney, Agent, or Firm* — Kenyon & Kenyon LLP

(57) ABSTRACT

A cover member includes: a cover body that is located such that a reverse surface of the cover body faces an engine; a sticker that has a sticker body and an adhesive layer, the sticker body being formed such that the sticker body covers an aesthetically-designed concave portion that is formed on a top surface of the cover body, the adhesive layer being provided on a reverse-surface side of the sticker body to adhere the sticker body to the cover body; and a communication path that communicates an interior of the aesthetically-designed concave portion with the atmosphere.

9 Claims, 5 Drawing Sheets

COVER MEMBER AND STICKER

INCORPORATION BY REFERENCE

The disclosure of Japanese Patent Application No. 2011-061092 filed on Mar. 18, 2011 including the specification, drawings and abstract is incorporated herein by reference in its entirety.

BACKGROUND OF THE INVENTION

1. Field of the Invention

The present invention relates to a cover member that protects an in-vehicle system, such as an engine, and relates to a sticker that is affixed to the cover member.

2. Description of Related Art

An in-vehicle system, such as an engine, is installed in an engine compartment of the vehicle. Such an in-vehicle system is provided with a cover member. The cover member is designed to absorb noise generated in the in-vehicle system and to protect the in-vehicle system. For example, Japanese Patent Application Publication No. 2007-230312 (JP-A-2007-230312) discloses a cover member that protects the engine, in which the engine is an example of the in-vehicle system.

The cover member is located at a position where a user can visually recognize this cover member when the user opens a hood of the vehicle to look the engine compartment. There has thus been an increasing trend to use a cover member for vehicles, which has an aesthetic appearance with a variety of designs on its top surface where the user can visually recognize. The design made on the cover member is typically formed with a convex pattern that bulges from the top surface of the cover member. In addition, one of the recently-known cover members has a colored convex portion to improve its aesthetic appearance. It should be understood that the design made on the cover member includes, for example, a logo mark that identifies the manufacturer of the vehicle, and characters that represent the name of technology.

There can be a case where cover members themselves have an identical shape, but have different designs on their respective top surfaces. In such a case, these cover members require different manufacturing processes. This creates a need for preparing many types of molds to be used for manufacturing the cover members, and thus causes an increase in manufacturing costs of the cover members.

Therefore, a method of manufacturing plural types of cover members having different designs on their top surfaces, which prevents an increase in manufacturing costs, has been considered in recent years. More specifically, in this method, a cover member is manufactured such that the cover member is formed with, on its top surface, a concave portion on which a first design is made (hereinafter referred to as "aesthetically-designed concave portion"). In turn, in this method, an additional cover member is manufactured such that the additional cover member has a second design, different from the first design, on its top surface. In this case, as illustrated in FIG. 8A, a sticker 110 on which the second design is made is affixed to the top surface of a cover member 100. In conjunction with this, the sticker 110 is affixed to the cover member 100 such that the sticker 110 covers an aesthetically-designed concave portion 101 that is formed on the top surface of the cover member 100. This eliminates a need for preparing plural molds, and thus enables plural types of cover members to be manufactured with different designs on their respective top surfaces, while preventing an increase in manufacturing costs of the cover members.

The sticker 110 includes a sticker body 111 and an adhesive layer 112. The sticker body 111 is made of polyethylene terephthalate (PET). The adhesive layer 112 is provided on a reverse surface of the sticker body 111. The adhesive layer 112 is formed on the entire reverse surface of the sticker body 111. The adhesive layer 112 is, for example, a double-faced tape.

The cover member 100 with the sticker 110 affixed thereto was placed in a high-temperature atmosphere to conduct an evaluation test of heat resistance. The evaluation test showed the following problems: At the point in time when a certain period of time elapsed since the start of the heat resistance evaluation test, a part of the sticker 110, which faces the concave portion 101, was recessed toward the concave portion 101, as illustrated in FIG. 8B.

During the heat resistance evaluation test, the sticker body 111 was partly recessed. This indicates that in the vehicle on which the cover member 100 is mounted, the sticker body 111 can possibly be recessed. If the phenomenon, in which the sticker 110 is recessed, occurs in the vehicle owned by the user, this phenomenon could cause deterioration of the aesthetic appearance of the cover member 100, and therefore, could, possibly cause user's discomfort. These problems can occur not only on the cover member for the engine, but also on any cover member for an in-vehicle system other than the engine installed in the engine compartment.

SUMMARY OF THE INVENTION

The present invention relates to a cover member and a sticker that allow the cover member to have an improved aesthetic appearance.

A first aspect of the invention relates to a cover member that is provided on an in-vehicle system, the in-vehicle system being installed in an engine compartment of a vehicle. The cover member includes: a cover body that is located such that a reverse surface of the cover body faces the in-vehicle system; a sticker that has a sticker body and an adhesive layer, the sticker body being formed such that the sticker body covers a first concave portion that is formed on a top surface of the cover body, the adhesive layer being provided on a reverse-surface side of the sticker body to adhere the sticker body to the cover body; and a communication path that communicates an interior space of the first concave portion with the atmosphere.

It is conceived that the reason why the sticker attached to cover the first concave portion of the cover body is recessed is caused by the fact that a pressure in the interior space of the first concave portion falls below the atmospheric pressure. Thus, the cover member of the invention is provided with the communication path that communicates the interior space of the first concave portion with the atmosphere. Therefore, although the sticker is provided on the top surface of the cover body such that the sticker covers the first concave portion, the interior space of the first concave portion communicates with the atmosphere through the communication path. This prevents the pressure in the interior space of the first concave portion from falling below the atmospheric pressure. In other words, the sticker provided on the cover body is prevented from being partly recessed. Thus, the sticker provided on the cover body allows the cover member to have an improved aesthetic appearance.

The communication path may be designed to communicate the interior space of the first concave portion with a space that is positioned on a top-surface side of the cover body.

According to the above feature, the interior space of the first concave portion communicates with a space on the opposite side of the in-vehicle system with respect to the cover member. In this case, the first concave portion need not have, on its bottom surface, a hole that serves as the communication path designed to communicate the interior space of the first concave portion with the atmosphere. Thus, the process of manufacturing the cover member need not include the step of forming the hole on the cover body.

The adhesive layer may be provided on a part of the reverse surface of the sticker body. The communication path may include a space defined between the top surface of the cover body and the reverse surface of the sticker body.

According to the above feature, the communication path is defined by forming the adhesive layer into an appropriate shape. That is, the interior space of the first concave portion communicates with the atmosphere through the communication path, independent of the shape of the first concave portion formed on the cover body. This prevents the sticker provided on the cover body from being partly recessed.

The adhesive layer may be provided on the reverse surface of the sticker body along a part of a peripheral edge of the sticker body.

According to the above feature, the adhesive layer has a smaller contact area where the adhesive layer contacts with gas in the first concave portion. Even if a material of the adhesive layer absorbs the gas in the first concave portion, the adhesive layer has a smaller contact area where the adhesive layer contacts with the gas in the first concave portion, and accordingly, the pressure in the first concave portion is more prevented from falling.

The in-vehicle system may be an engine. In the vehicle, the engine can also be a heat generating source. Because the cover member is located adjacent to the engine, the temperature of the cover member tends to rise. Assuming that a chemical reaction occurs between a material of a member (for example, the adhesive layer) that surrounds the first concave portion and the gas in the first concave portion, the rise in temperature of the cover member accelerates this chemical reaction. In response to this, the pressure tends to fall in the first concave portion. However, according to the invention, the interior space of the first concave portion communicates with the atmosphere through the communication path. Therefore, under these environmental conditions, the sticker is still prevented from being recessed, as the internal space of the first concave portion communicates with the atmosphere through the communication path.

The sticker may have a metallic film that is formed on the reverse surface of the sticker body. The sticker may also have an anticorrosion layer that is provided on the reverse-surface side of the sticker body to prevent corrosion of the metallic film. The adhesive layer may be provided on a surface of the anticorrosion layer, which faces the cover body.

Moisture (liquid or water vapor) enters a space on a reverse-surface side of the sticker through the communication path. Thus, if the metallic film formed on the reverse-surface side of the sticker body is exposed, the metallic film corrodes due to the moisture that enters the communication path or the interior of the first concave portion.

Such corrosion causes at least a part of the metallic film to be discolored. This undesirably deteriorates the aesthetic appearance of the cover member including the sticker. Thus, the sticker may be provided with the anticorrosion layer that prevents corrosion of the metallic film. Therefore, the metallic film provided on the sticker body is also prevented from discoloration due to the corrosion of the metallic film. Accordingly, the sticker provided on the cover member is prevented from deterioration of its aesthetic appearance.

The cover body may have a second concave portion for positioning that is formed at a position where the sticker is attached to the cover body. The first concave portion may be formed on a bottom surface of the second concave portion for positioning.

According to the above feature, there is a gap between a sidewall of the sticker and a sidewall of the second concave portion for positioning. The gap is sized to allow for dimensional tolerances of the sticker. This gap prevents water or other liquid from entering the communication path from the atmosphere. Thus, the water or other liquid can less easily enter the space on the reverse-surface side of the sticker body, and accordingly, the metallic film provided on the sticker body is more prevented from corrosion.

The first concave portion may be formed with a first pattern. The sticker may be formed with a second pattern such that the second pattern can be visually recognized from a top-surface side of the sticker.

According to the above feature, the cover body is also utilized as a cover member even when the sticker is not attached to the cover body. A second aspect of the invention relates to a sticker that is affixed to a top surface of a cover body of a cover member that is provided on an in-vehicle system such that the sticker covers a concave portion that is formed on the top surface of the cover body, the in-vehicle system being installed in an engine compartment of a vehicle. The sticker includes: a plate-shaped sticker body; and an adhesive layer that is provided on a reverse-surface side of the sticker body to adhere the sticker body to the cover body, in which the adhesive layer is provided along a part of a peripheral edge of the sticker body.

According to the above feature, the sticker is affixed to the top surface of the cover body such that the sticker covers a first concave portion that is formed on the top surface of the cover body. Thus, there is a space created between the top surface of the cover body and the reverse surface of the sticker body to communicate an interior space of the first concave portion with the atmosphere. That is, although the sticker is affixed to the top surface of the cover body, the internal space of the first concave portion communicates with the atmosphere. This prevents the pressure in the internal space of the first concave portion from falling below the atmospheric pressure. In other words, the sticker provided on the cover body is prevented from being partly recessed. Therefore, the sticker provided on the cover body is less likely to be recessed. This allows the cover member to have an improved aesthetic appearance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
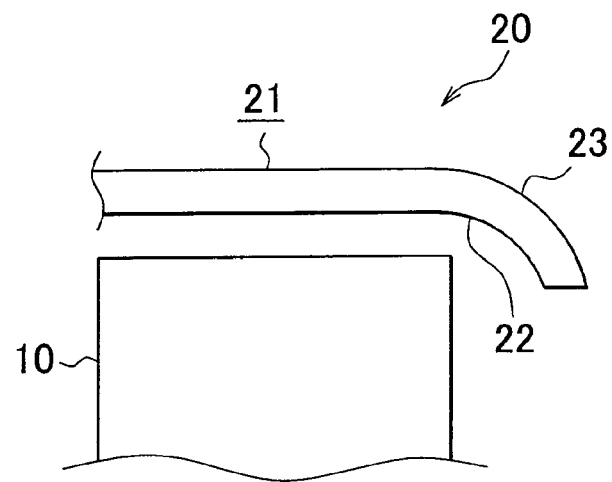
FIG. 1 is a schematic view of a cover member according to one embodiment of the invention.

One embodiment of the present invention will be described below with reference to FIG. 1 to FIG. 5. As illustrated in FIG. 1, an engine 10 is installed in an engine compartment of a vehicle. The engine 10 is an example of the in-vehicle system. Above the engine 10, a cover member 20 (hereinafter also referred to as "engine cover") is provided in order to absorb noise generated in the engine 10 and to protect the engine 10.

The cover member 20 includes a cover body 21 that is made of synthetic resin. The cover body 21 is located such that a reverse surface 22 of the cover body 21 faces the engine 10. In turn, a top surface 23 of the cover body 21 can be visually recognized by a user, when the user opens a hood (not illustrated).

Figure 2:
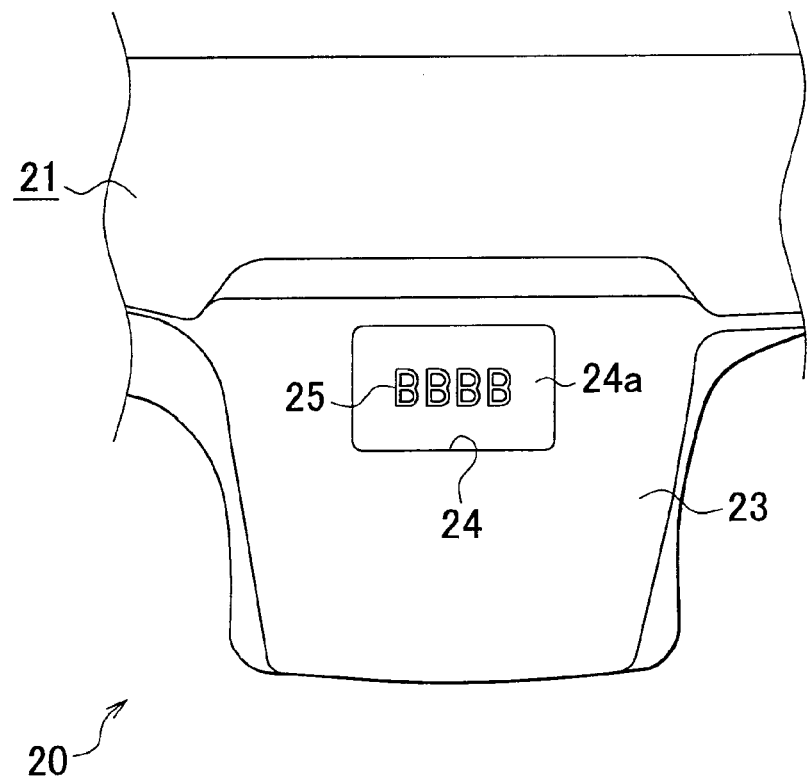
FIG. 2 is a plan view of an essential part of the cover member.

As illustrated in FIG. 2, on the top surface 23 of the cover body 21, a positioning concave portion 24 is formed into a generally rectangular shape in plan view. The positioning concave portion 24 has a bottom surface 24a. At the center of the bottom surface 24a, an aesthetically-designed concave portion 25 is formed with a first pattern. According to the embodiment of the invention, the aesthetically-designed concave portion 25 is formed with alphabetic characters "BBBB". This aesthetically-designed concave portion 25 can be regarded as the first concave portion and the concave portion.

Figure 3:
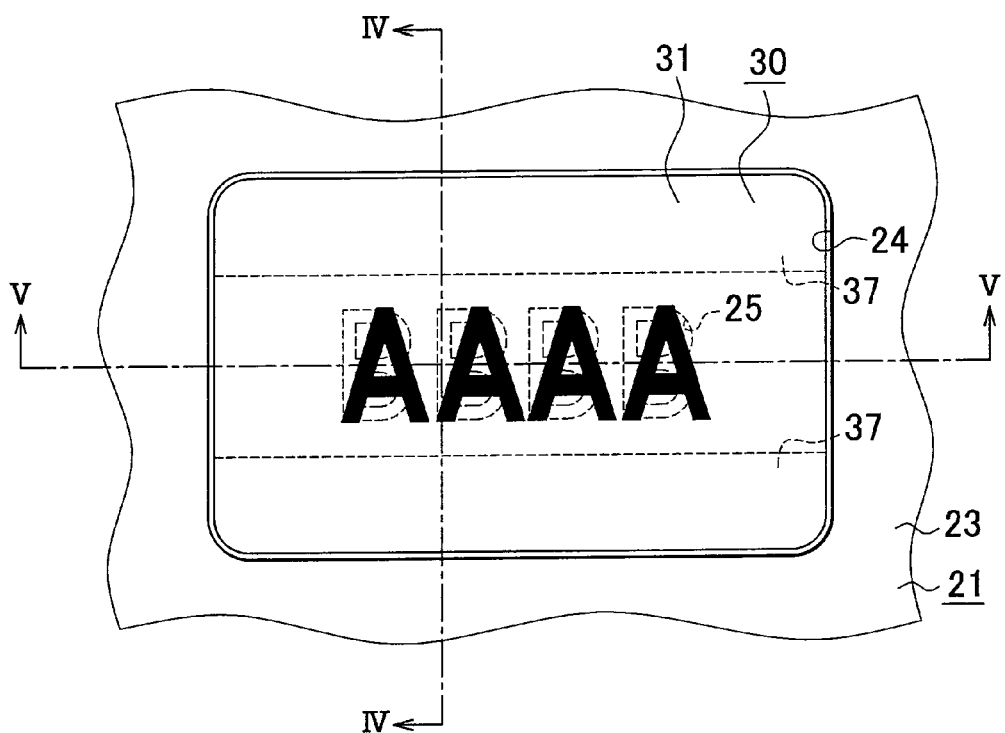
FIG. 3 is a plan view of the essential part of the cover member with a sticker affixed thereto.

As illustrated in FIG. 3, a sticker 30 is affixed to the bottom surface 24a of the positioning concave portion 24 such that the sticker 30 covers the aesthetically-designed concave portion 25. Thus, when the sticker 30 is affixed to the cover body 21, the aesthetically-designed concave portion 25 cannot be visually recognized from the outside. In addition, there is a gap between a sidewall of the positioning concave portion 24 and a peripheral wall of the sticker 30 that is affixed to the bottom surface 24a of the positioning concave portion 24. The gap is sized to allow for dimensional tolerances of the sticker 30.

Figure 4:
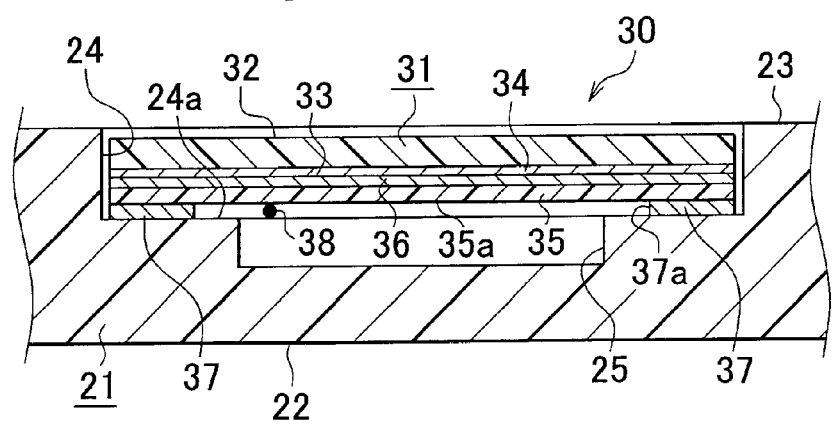
FIG. 4 is a cross-sectional view taken along the line 4-4 in FIG. 3.
Figure 5:
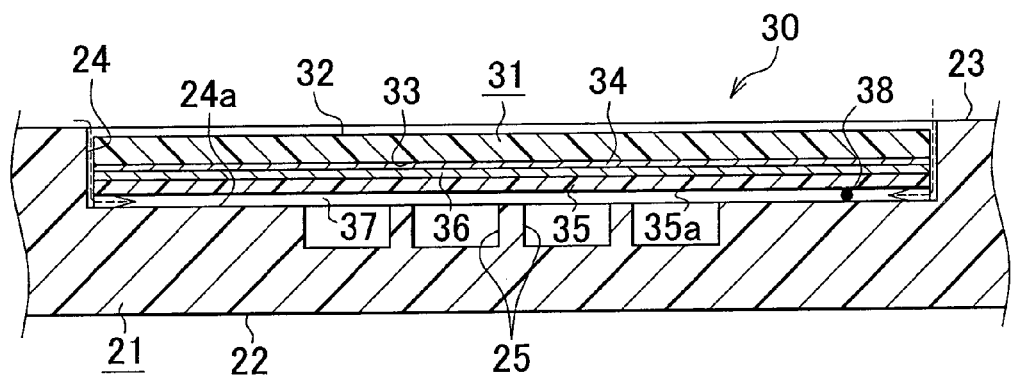
FIG. 5 is a cross-sectional view taken along the line 5-5 in FIG. 3.

With reference to FIG. 4 and FIG. 5, the sticker 30 will be described below. As illustrated in FIG. 4, and FIG. 5, the sticker 30 includes a sticker body 31. The sticker body 31 is formed into a generally rectangular plate shape. The sticker body 31 is made of synthetic resin. One of examples of the synthetic resin is polyethylene terephthalate (PET). The sticker 31 is a transparent PET sticker. The sticker body 31 has a top surface 32 (an upper surface in FIG. 4 and FIG. 5) on which a second pattern (with alphabetic characters "AAAA" according to the embodiment of the invention) is made. The sticker body 31 also has a reverse surface 33 (a lower surface in FIG. 4 and FIG. 5) on which a metallic film 34 is formed. One of examples of the metallic film 34 is an aluminum film. According to the embodiment of the invention, the sticker 31 is a transparent plate material. Therefore, the metallic film 34 provided on the reverse surface 33 of the sticker body 31 can be visually recognized from the top-surface side of the sticker 30.

An anticorrosion layer 35 is provided on the reverse-surface side of the sticker body 31. The anticorrosion layer 35 is made of synthetic resin to prevent corrosion of the metallic film 34. PET is one of examples of the synthetic resin from which the anticorrosion layer 35 is made. Between the anticorrosion layer 35 and the metallic film 34, a bonding layer 36 is provided to bond the anticorrosion layer 35 to the metallic film 34. The bonding layer 36 is, for example, a double-faced tape.

An adhesive layer 37 is provided on the reverse surface of the anticorrosion layer 35 to adhere the sticker body 31 to the cover body 21. The adhesive layer 37 is located at a position where the anticorrosion layer 35 does not face the aesthetically-designed concave portion 25 of the cover body 21. According to the embodiment of the invention, the adhesive layer 37 is formed on each of the transversely opposite edges (on the left and right ends in FIG. 4) of the sticker 30, and extends along the longitudinal direction of the sticker 30 (in the direction perpendicular to the sheet plane in FIG. 4). In other words, the adhesive layer 37 is provided on the reverse surface 33-side of the sticker body 31 along a part of a peripheral edge of the sticker body 31. A thickness dimension of the adhesive layer 37 is sufficiently smaller than a depth dimension of the aesthetically-designed concave portion 25.

Therefore, an interior space of the aesthetically-designed concave portion 25 communicates with a space above the cover member 20 in the engine compartment or a space on the top-surface side of the cover member 20 through a communication path 38. The communication path 38 is defined by the bottom surface 24a of the positioning concave portion 24, the reverse surface 35a of the anticorrosion layer 35, and a side surface 37a of each adhesive layer 37. In short, the communication path 38 is defined partly by a space created between the top surface 23 of the cover body 21 and the reverse surface 33 of the sticker body 31. Owing to this communication path 38 thus defined, a pressure in the aesthetically-designed concave portion 25 is maintained at the same level as the pressure in the engine compartment or the atmospheric pressure.

A function of the cover member 20 when the engine 10 is running will be next described below. When the engine 10 starts running, the engine 10 becomes a heat generating source. Heat is generated by this engine 10 and is transmitted to the cover member 20 located adjacent to the engine 10. This causes the temperatures of the cover body 21 and the sticker 30 to start rising. The cover body 21 and the sticker 30 are included in the cover member 20. In response to the rise in temperature, the pressure tends to fall in the aesthetically-designed concave portion 25 of the cover body 21. It is conceivable that this is because the adhesive layer 37 of the sticker 30 absorbs part of air (gas) in the aesthetically-designed concave portion 25. To be more specific, a chemical reaction can possibly occur between a material of the adhesive layer 37 and the part of the air in the aesthetically-designed concave portion 25. In this case, the chemical reaction is more likely to occur as the temperature of the gas in the aesthetically-designed concave portion 25 or the temperature of the adhesive layer 37 rises.

However, according to the embodiment of the invention, the internal space of the aesthetically-designed concave portion 25 communicates with the outside (atmosphere) through the communication path 38. Thus, although the adhesive layer 37 absorbs the part of the air in the aesthetically-designed concave portion 25, air flows into the aesthetically-designed concave portion 25 through the communication path 38, as illustrated by a dotted arrow in FIG. 5. This allows the pressure in the aesthetically-designed concave portion 25 to be maintained at the same level as the external pressure. Consequently, a part of the sticker 30, which faces the aesthetically-designed concave portion 25, is not recessed toward the aesthetically-designed concave portion 25. In other words, the sticker 30 is prevented from being recessed due to a differential pressure between the pressure in the aesthetically-designed concave portion 25 and the pressure in the space on the top-surface side of the sticker 30.

During washing the vehicle, cleaning water can be sprayed directly on the cover member 20 to clean the cover member 20. In this case, the cleaning water can possibly enter the aesthetically-designed concave portion 25 through the communication path 38. The cover member 20 has no function of discharging the cleaning water out of the aesthetically-designed concave portion 25. This causes the cleaning water to be stored in the aesthetically-designed concave portion 25 for a long period of time. If the anticorrosion layer 35 that protects the metallic film 34 of the sticker 30 is not provided, metal in the metallic film 34 corrodes due to the cleaning water stored in the aesthetically-designed concave portion 25. Such corrosion causes at least a part of the metallic film 34 to be discolored. This deteriorates the aesthetic appearance of the sticker 30. However, according to the embodiment of the invention, the sticker 30 is provided with the anticorrosion layer 35 that protects the metallic film 34. This prevents the metal in the metallic film 34 from corrosion. Therefore, the metallic film 34 is also prevented from discoloration due to the corrosion of the metallic film 34. Accordingly, the sticker 30 affixed to the cover member 20 is prevented from deterioration of its aesthetic appearance.

Thus, according to the embodiment of the invention, the following effects are obtained:

(1) The communication path 38 is provided for the cover member 20. The communication path 38 is designed to communicate the interior space of the aesthetically-designed concave portion 25 of the cover body 21 with the outside of the cover body 21 (atmosphere). This prevents the pressure in the aesthetically-designed concave portion 25 from falling below the external pressure. In other words, the sticker 30 affixed to the top surface 23 of the cover body 21 is prevented from being partly recessed. Therefore, the sticker 30 is affixed to the cover body 21 that has an aesthetic appearance, so that the cover member 20 has the improved aesthetic appearance.

(2) The interior space of the aesthetically-designed concave portion 25 communicates with the space on the opposite side of the engine 10 with respect to the cover member 20. Thus, the aesthetically-designed concave portion 25 need not have, on its bottom surface, a hole that serves as the communication path designed to communicate the interior space of the aesthetically-designed concave portion 25 with the outside. Therefore, the process of manufacturing the cover member 20 need not include the step of forming the hole on the cover body 21.

(3) The aesthetically-designed concave portion 25 does not have, on its bottom surface, the hole designed to communicate the interior space of the aesthetically-designed concave portion 25 with the outside. This allows the cover body 21 to be utilized as a cover member, even when the sticker 30 is not affixed to the cover body 21. In other words, two or more types of cover members are available by selecting whether to affix or not to affix the sticker 30 to one type of the cover body 21.

(4) The communication path 38 is defined by forming the adhesive layer 37 of the sticker 30 into an appropriate shape. More specifically, the interior space of the aesthetically-designed concave portion 25 communicates with the outside through the communication path 38 independent of the shape of the aesthetically-designed concave portion 25 formed on the cover body 21.

(5) The engine 10 of the vehicle can also be a heat generating source. Because the cover member 20 is located adjacent to this engine 10, the temperature of the cover member 20 tends to rise. In response to the rise in temperature, the pressure tends to fall in the aesthetically-designed concave portion 25 formed on the cover body 21. Under these environmental conditions, the sticker 30 is still prevented from being partly recessed, as the internal space of the aesthetically-designed concave portion 25 communicates with the outside through the communication path 38.

(6) According to the embodiment of the invention, the sticker 30 includes the anticorrosion layer 35 that prevents corrosion of the metallic film 34. This prevents the metallic film 34 from corrosion due to moisture entering the aesthetically-designed concave portion 25. Therefore, the metallic film 34 is also prevented from discoloration due to the corrosion of the metallic film 34. Accordingly, the cover member 20 including the sticker 30 is prevented from deterioration of their aesthetic appearances.

(7) According to the embodiment of the invention, the sticker 30 is affixed to the bottom surface 24a of the positioning concave portion 24. This allows creating a gap between the peripheral wall of the sticker 30 and the sidewall of the positioning concave portion 24. The gap is sized to allow for dimensional tolerances of the sticker 30. This gap is so narrow that the moisture is prevented from entering the communication path 38 from the outside therethrough. Therefore, the moisture does not easily enter the aesthetically-designed concave portion 25. Accordingly, the metallic film 34 of the sticker 30 is prevented from discoloration due to the corrosion of the metallic film 34.

It should be understood that the embodiment of the invention may be modified as other embodiments to be described as follows: According to the other embodiment, the positioning concave portion 24 may not be provided for the cover member 21. In this embodiment, moisture enters the aesthetically-designed concave portion 25 from the outside through the communication path 38 more easily, compared to the aforementioned embodiment in which the positioning concave portion 24 is provided. However, the sticker 30 has, on its reverse-surface side, the anticorrosion layer 35 that prevents corrosion of the metallic film 34. This prevents corrosion of the metallic film 34 of the sticker 30.

According to the other embodiment, the sticker body 31 of the sticker 30 may be a non-transparent plate. In this embodiment, the metallic film 34 need not be provided on the reverse-surface side of the sticker body 31. Also, the anticorrosion layer 35 need not be provided on the reverse-surface side of the sticker body 31 unless the sticker body 31 corrodes due to moisture.

The sticker 30 may be subjected to coloring treatment on the entire top surface of the sticker body 31. In this embodiment, neither the metallic film 34 nor the anticorrosion layer 35 need be provided on the reverse-surface side of the sticker body 31.

Figure 6:
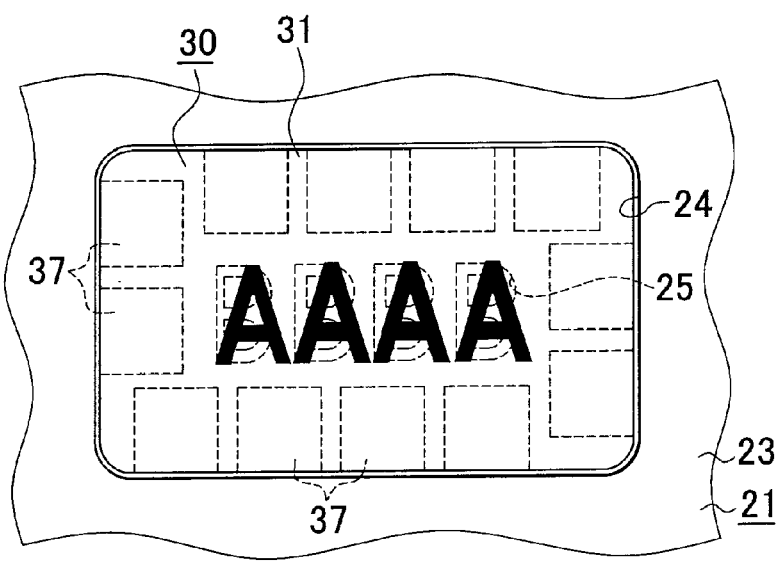
FIG. 6 is a plan view of a sticker according to the other embodiment of the invention.

The adhesive layer 37 may be provided on either one of the longitudinal opposite edges of the sticker 30. The adhesive layer 37 may be located at regular intervals along the peripheral edge of the sticker 30, as illustrated in FIG. 6.

The adhesive layer 37 may be provided on a part of the reverse surface of the sticker 30 at which the reverse surface faces the aesthetically-designed concave portion 25, as long as the communication path is formed to communicate the interior space of the aesthetically-designed concave portion 25 with the outside.

Figure 7A:
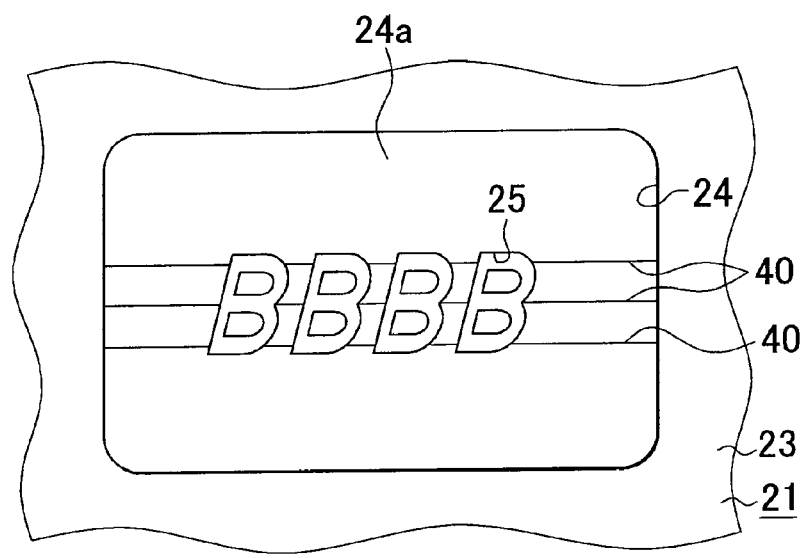
FIG. 7A is a plan view of an essential part of a cover body according to the other embodiment of the invention.
Figure 7B:
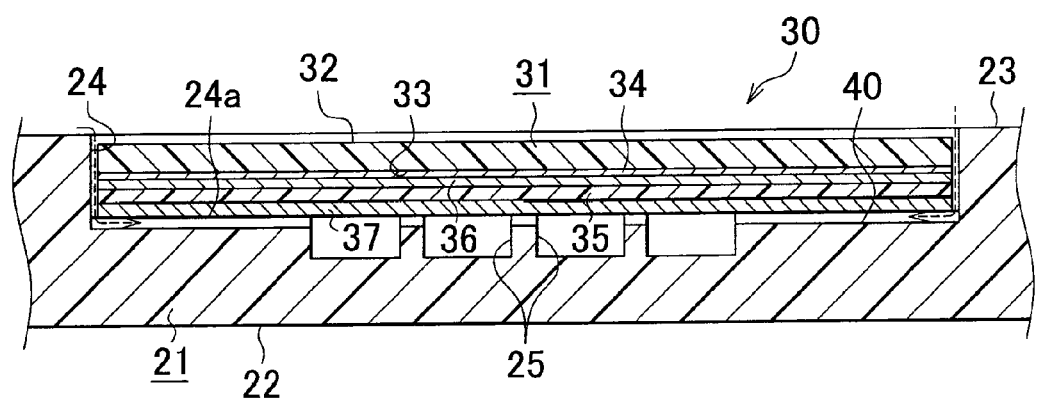
FIG. 7B is a cross-sectional view that schematically illustrates how the sticker is affixed to the cover body illustrated in FIG. 7A.
Figure 8A:
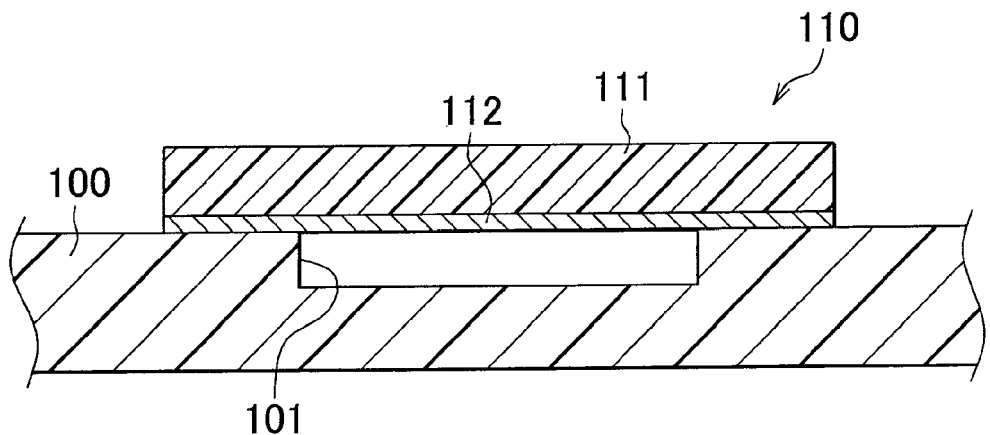
FIG. 8A and FIG. 8B are schematic cross-sectional views of the related-art cover member.
Figure 8B:
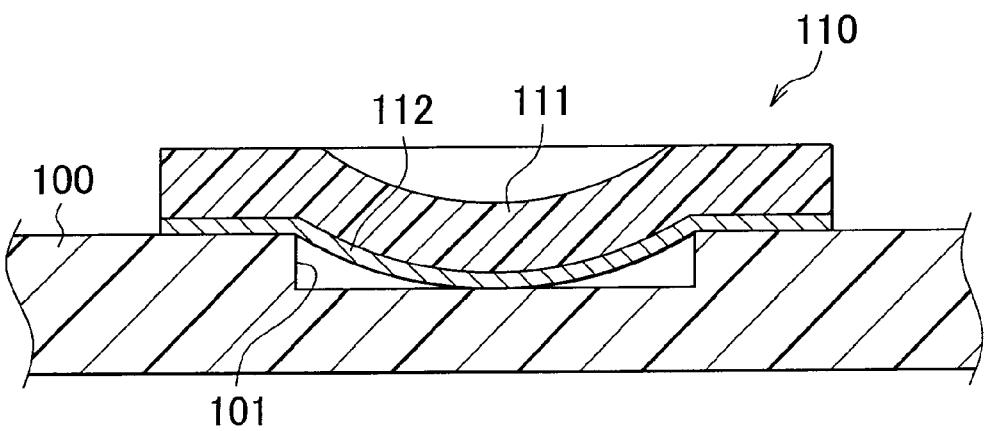

The adhesive layer 37 may be provided on the entire reverse surface of the sticker 30. In this embodiment, as illustrated in FIGS. 7A and 7B, the cover body 21 may be provided with a groove 40 that is continuously formed with the aesthetically-designed concave portion 25. In this embodiment, the groove 40 serves as the communication path.

A concave portion to be covered by the sticker 30 may not have the first pattern thereon. For example, the concave portion may be the one which the cover member 21 is formed with. In this embodiment, the sticker 30 is affixed to the cover body 21 to cover the concave portion of the cover body 21. The communication path designed to communicate this concave portion with the outside may be a through hole that extends through from a bottom surface of the concave portion to a reverse side 22 of the cover body 21. If the through hole is formed on the cover body 21, the adhesive layer 37 may be provided on the entire reverse surface of the sticker 30.

The adhesive layer 37 may not be a double-faced tape, but may be a layer made of an adhesive. According to the other embodiment, the cover body 21 may also be made of any material other than synthetic resin (for example, a stainless material).

The in-vehicle system may be any system (for example, a battery) other than the engine 10, as long as the system is installed in the engine compartment.

What is claimed is:

1. A cover member for an in-vehicle system that is installed in an engine compartment of a vehicle, the cover member comprising:
   a cover body that is located such that a reverse surface of the cover body faces the in-vehicle system;
   a sticker that has a sticker body and an adhesive layer, the sticker body being formed such that the sticker body covers a first concave portion that is formed on a top surface of the cover body, the adhesive layer being provided on a reverse-surface side of the sticker body to adhere the sticker body to the cover body; and
   a communication path that communicates an interior space of the first concave portion with atmosphere.

2. The cover member according to claim 1, wherein
   the communication path communicates the interior space of the first concave portion with a space that is positioned on a top-surface side of the cover body.

3. The cover member according to claim 2, wherein
   the adhesive layer is provided on a part of a reverse surface of the sticker body, and the communication path includes a space defined between the top surface of the cover body and the reverse surface of the sticker body.

4. The cover member according to claim 3, wherein
   the adhesive layer is provided on the reverse surface of the sticker body along a part of a peripheral edge of the sticker body.

5. The cover member according to claim 1, wherein
   the in-vehicle system is an engine.

6. The cover member according to claim 4, wherein
   the sticker has a metallic film that is formed on the reverse surface of the sticker body, the sticker has an anticorrosion layer that is provided on the reverse-surface side of the sticker body to prevent corrosion of the metallic film, and the adhesive layer is provided on a surface of the anticorrosion layer, which faces the cover body.

7. The cover member according to claim 6, wherein
   the cover body has a second concave portion for positioning that is formed at a position where the sticker is attached to the cover body, and the first concave portion is formed on a bottom surface of the second concave portion for positioning.

8. The cover member according to claim 2, wherein
   the first concave portion is formed with a first pattern, and the sticker is formed with a second pattern such that the second pattern can be visually recognized from a top-surface side of the sticker.

9. A sticker that is affixed to a top surface of a cover body of a cover member that is provided on an in-vehicle system such that the sticker covers a concave portion that is formed on the top surface of the cover body, the in-vehicle system being installed in an engine compartment of a vehicle, the sticker comprising:
   a plate-shaped sticker body; and
   an adhesive layer that is provided on a reverse-surface side of the sticker body to adhere the sticker body to the cover body,
   wherein the adhesive layer is provided along a part of a peripheral edge of the sticker body, and
   wherein the adhesive layer is provided so as not to cover the whole of the concave portion.

\* \* \* \* \*